United States Patent
Xu et al.

(10) Patent No.: US 9,810,932 B2
(45) Date of Patent: Nov. 7, 2017

(54) DRIVER CHIP, DRIVER BOARD AND TEST METHOD THEREOF, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shuai Xu, Beijing (CN); Zhengxin Zhang, Beijing (CN); Zhiyong Wang, Beijing (CN)

(73) Assignees: BOE TECHNOLOGY GROUP CO., LTD.; BEIJING BOE OPTOELECTRONICS TECHNOLOGY CO., LTD.

( * ) Notice: Subject to any disclaimer, the term of this patent is extended or adjusted under 35 U.S.C. 154(b) by 69 days.

(21) Appl. No.: 14/913,323

(22) PCT Filed: Aug. 12, 2015

(86) PCT No.: PCT/CN2015/086761
§ 371 (c)(1),
(2) Date: Feb. 19, 2016

(87) PCT Pub. No.: WO2016/165248
PCT Pub. Date: Oct. 20, 2016

(65) Prior Publication Data
US 2017/0059897 A1    Mar. 2, 2017

(30) Foreign Application Priority Data
Apr. 16, 2015    (CN) .......................... 2015 1 0179895

(51) Int. Cl.
*G02F 1/13*    (2006.01)
*G09G 3/36*    (2006.01)
(Continued)

(52) U.S. Cl.
CPC .......... *G02F 1/1309* (2013.01); *G02F 1/1368* (2013.01); *G02F 1/13306* (2013.01);
(Continued)

(58) Field of Classification Search
CPC .. G02F 1/1309; G02F 1/13306; G02F 1/1368; G02F 1/1345; G09G 3/3648; G09G 3/36; G09G 3/006; G09G 2310/08
(Continued)

(56) References Cited

U.S. PATENT DOCUMENTS 4,183,460 A * 1/1980 Yuen .................. G01R 31/3004
714/732
5,127,009 A * 6/1992 Swanson ............ G01R 31/2806
714/724

(Continued)

FOREIGN PATENT DOCUMENTS

CN    1581861 A    2/2005
CN    1749813      3/2006
(Continued)

OTHER PUBLICATIONS

Office Action in Chinese Application No. 201510179895.4 dated Aug. 1, 2016, with English translation. 9 pages.
(Continued)

*Primary Examiner* — Fred Tzeng
(74) *Attorney, Agent, or Firm* — Blakely Sokoloff Taylor & Zafman LLP

(57) ABSTRACT

A driver chip, a driver board and a test method thereof, and a display device. The driver chip includes a first internal interface, a second internal interface and a test circuit for performing a short-circuit detection on the internal interfaces, including an input unit and a test unit. The input unit is connected to a test signal input terminal and the first internal interface for transmitting a test signal inputted to the
(Continued)

test unit and the first internal interface when in an ON state. The test unit is connected with the second internal interface and a test signal output terminal used for preventing a signal outputted by the input unit from being outputted from the test unit when in an OFF state. The test method detects whether a short-circuit has occurred to interfaces on the driver chip.

19 Claims, 7 Drawing Sheets

(51) Int. Cl.
*G02F 1/133* (2006.01)
*G02F 1/1368* (2006.01)

(52) U.S. Cl.
CPC .............. *G09G 3/36* (2013.01); *G09G 3/3648* (2013.01); *G09G 2310/08* (2013.01)

(58) Field of Classification Search
USPC ........................................................ 345/205
See application file for complete search history.

(56) References Cited

U.S. PATENT DOCUMENTS

| | | | | |
|---|---|---|---|---|
| 5,371,712 A * | 12/1994 | Oguchi | ................. | G11C 29/02 365/201 |
| 6,017,354 A * | 1/2000 | Culp | ..................... | A61B 90/98 604/22 |
| 6,182,807 B1 * | 2/2001 | Saito | .................. | B60G 17/0185 191/2 |
| 2003/0098211 A1 * | 5/2003 | Saito | .................. | B60G 17/0185 191/3 |
| 2005/0110526 A1 | 5/2005 | Ishibashi et al. | | |
| 2005/0157243 A1 * | 7/2005 | Hayata | .................. | G02F 1/1345 349/149 |
| 2005/0168491 A1 * | 8/2005 | Takahara | ................ | G09G 3/006 345/690 |
| 2008/0117345 A1 * | 5/2008 | Ishii | .................. | G02F 1/136204 349/40 |
| 2015/0131187 A1 * | 5/2015 | Krein | ..................... | H02S 50/00 361/67 |
| 2015/0185287 A1 * | 7/2015 | Wang | ..................... | G01R 31/42 324/765.01 |

FOREIGN PATENT DOCUMENTS

| | | |
|---|---|---|
| CN | 101369404 | 2/2009 |
| CN | 102213738 A | 10/2011 |
| CN | 103063975 | 4/2013 |
| CN | 103926496 A | 7/2014 |
| CN | 104732947 | 6/2015 |
| JP | 2010198023 | 9/2010 |
| KR | 20110094824 A | 8/2011 |
| TW | I334029 B | 12/2010 |

OTHER PUBLICATIONS

International Search Report and Written Opinion with English Language Translation, dated Jan. 5, 2016, Application No. PCT/CN2015/086761.

* cited by examiner

DRIVER CHIP, DRIVER BOARD AND TEST METHOD THEREOF, AND DISPLAY DEVICE

TECHNICAL FIELD

The disclosure relates to the field of display driver, and in particular, to a driver chip, a driver board and a test method thereof, and a display device.

BACKGROUND

As a panel display device, Thin Film Transistor Liquid Crystal Displays (TFT-LCDs) find wider and wider applications in the high performance display field, due to its characteristics of a small volume, low power consumption, no radiation and a relatively low production cost, etc.

A TFT-LCD display device may comprise an LCM (Liquid Crystal Module), which comprises components such as a liquid crystal display panel, a peripheral circuit, a control circuit board 11 as shown in FIG. 1, and a backlight module. The control circuit board 11 may provide a control signal to cause the display device to display a picture. The control circuit board 11 may comprise a plurality of integrated circuit chips ICs, and each of the integrated circuit chips is provided with a plurality of I/O interfaces 100, such that the control signal can be outputted from the I/O interfaces 100.

In the prior art, for a small-sized display device, for example, a mobile phone, a palm computer, etc., due to the limitation of the structure size, the sizes of the I/O interfaces 100 and the distance between two neighboring I/O interfaces 100 have to be decreased in the design procedure. As such, due to the manufacture tolerance of the I/O interfaces 100, two neighboring I/O interfaces 100 may overlap and contact each other directly, thereby causing short-circuit. If the short-circuit cannot be found timely, undesirable phenomena, such as the circuit being burned out, will happen, which influences the quality of a product seriously.

SUMMARY

It is an object of the disclosure to provide a driver chip, a driver board and test method thereof, and a display device, whereby whether short-circuit has occurred to interfaces on the driver chip may be detected before the driver chip begins to work.

To achieve the above object, embodiments of the disclosure adopt the following technical solutions.

According to a first aspect of the disclosure, a driver chip is provided comprising: a first internal interface; a second internal interface; and a test circuit configured to perform a short-circuit detection on the internal interfaces, the test circuit comprising an input unit and a test unit. The input unit is connected with a test signal input terminal, the test unit and the first internal interface, respectively, and configured to transmit a test signal inputted via the test signal input terminal to the test unit and the first internal interface when in an ON state. The test unit is connected with the second internal interface and a test signal output terminal, respectively, and configured to prevent a signal outputted by the input unit from being outputted from the test unit to the test signal output terminal and the second internal interface when in an OFF state.

According to a second aspect of the disclosure, a driver board is provided comprising any of driver chips as described above and an external interface located at a snap-fit position of the driver board. Each of the internal interfaces of the driver chip is connected with a respective external interface.

According to a third aspect of the disclosure, a test method is provided for testing a driver board as described above. The method comprises: turning the input unit on; turning the test unit off; inputting by the test signal input terminal a test signal; short-circuit having occurred between at least two internal interfaces in the driver chip on the driver board if a first voltage is outputted from the test signal output terminal; short-circuit having not occurred between the internal interfaces in the driver chip on the driver board if a second voltage is outputted from the test signal output terminal. The first voltage is greater than the second voltage.

According to a fourth aspect of the disclosure, a display device is provided comprising a driver board as described above.

The disclosure is based on the following idea: in the case that a test signal of a first voltage (e.g., a high level) is inputted to the test signal input terminal of the driver chip, the test unit in the test circuit is turned off, such that the inputted test signal can only be transferred to the first internal interface, and cannot arrive at the test signal output terminal via the test unit. At this point, a second voltage (e.g., a low level) is supposed to be outputted from the test signal output terminal. Otherwise, if at this point a high level is outputted from the test signal output terminal, it shows that short-circuit has occurred between at least two internal interfaces on the driver chip, such that the inputted test signal is transmitted to the test signal output terminal via a signal transmission path formed by the above-mentioned internal interfaces to which short-circuit has occurred, and thus a high level is outputted. Therefore, in the case that the test unit is turned off, it may be judged whether short-circuit has occurred between internal interfaces on the driver chip by judging whether the test signal output terminal is of a high level. As such, before the driver chip operates, it may be tested whether short-circuit exists between internal interfaces on the driver chip, thereby avoiding undesirable phenomena of the circuit being burned out due to short-circuit of internal interfaces in the work procedure of the driver chip.

BRIEF DESCRIPTION OF THE DRAWINGS

In order to more clearly illustrate the technical solutions of embodiments of the disclosure, the accompanying drawings will be introduced briefly below. Obviously, the following drawings are only some embodiments of the disclosure, and for those of ordinary skills in the art, other drawings may also be derived from these drawings without making any inventive effort.

DETAILED DESCRIPTION

In the following the technical solutions in embodiments of the disclosure will be described clearly and completely in connection with the drawings. Obviously, the described embodiments are only a part of the embodiments of the disclosure, and not all the embodiments. From the embodiments in the disclosure, all other embodiments derived by those of ordinary skills in the art without making any inventive effort fall within the scope of the disclosure.

Figure 2A:
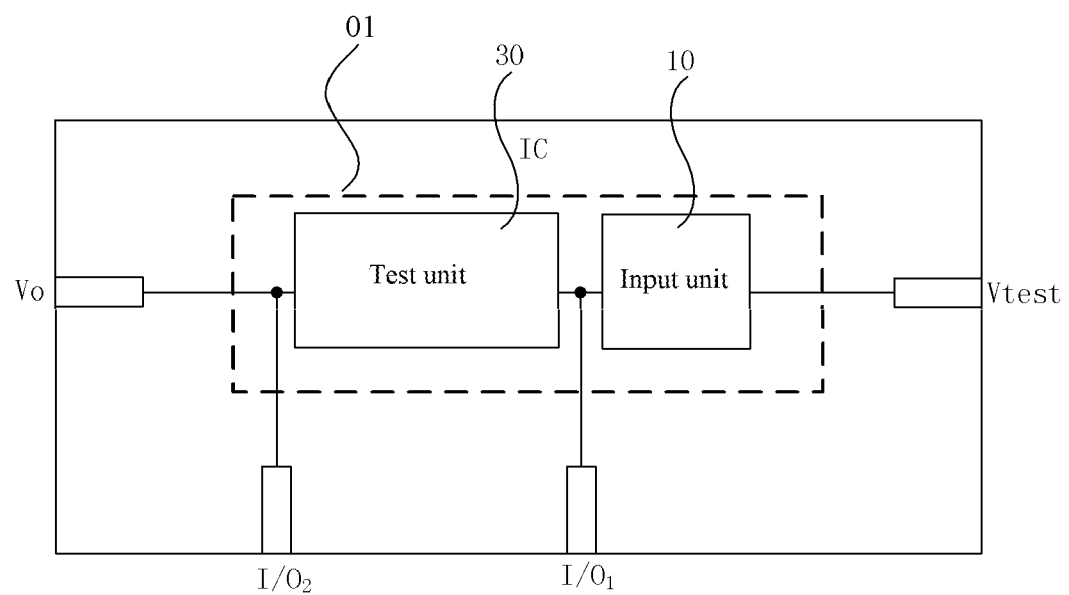
FIG. 2a is a structural schematic diagram of a driver chip according to an embodiment of the disclosure.

FIG. 2a is a structural schematic diagram of a driver chip according to an embodiment of the disclosure. As shown in the figure, the driver chip IC may comprise a first internal interface $I/O_1$, a second internal interface $I/O_2$ and a test circuit 01 for performing a short-circuit detection. The test circuit 01 may comprise an input unit 10 and a test unit 30.

The input unit 10 may be connected with a test signal input terminal Vtest, the test unit 30 and the first internal interface $I/O_1$, respectively, and used for transmitting a test signal inputted by the test signal input terminal Vtest to the test unit 30 and the first internal interface $I/O_1$ when in an ON state.

The test unit 30 is connected with the second internal interface $I/O_2$ and a test signal output terminal Vo, respectively, and used for preventing a signal outputted by the input unit 10 from being outputted from the test unit 30 to the test signal output terminal Vo and the second internal interface $I/O_2$ when in an OFF state. In addition, when in the ON state, the test unit 30 may output a signal outputted by the input unit 10 or a signal from the first internal interface $I/O_1$ to the test signal output terminal Vo.

Figure 2B:
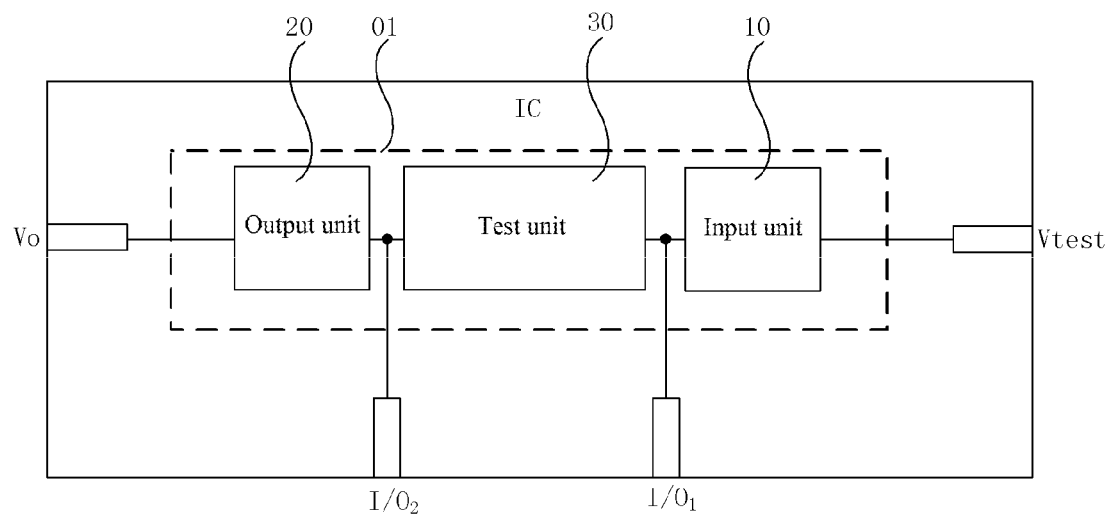
FIG. 2b is a structural schematic diagram of another driver chip according to an embodiment of the disclosure.

FIG. 2b is a structural schematic diagram of another driver chip according to an embodiment of the disclosure, wherein the driver chip IC may further comprise an output unit 20, which is between the test signal output terminal Vo and the second internal interface $I/O_2$, and used for outputting a voltage at the second internal interface $I/O_2$ or a signal outputted by the test unit 30 to the test signal output terminal Vo when in an ON state.

A specific structure and test procedure of the test circuit 01 in the above described driver chip will be described in detail below by way of specific embodiments.

First Embodiment

Figure 3:
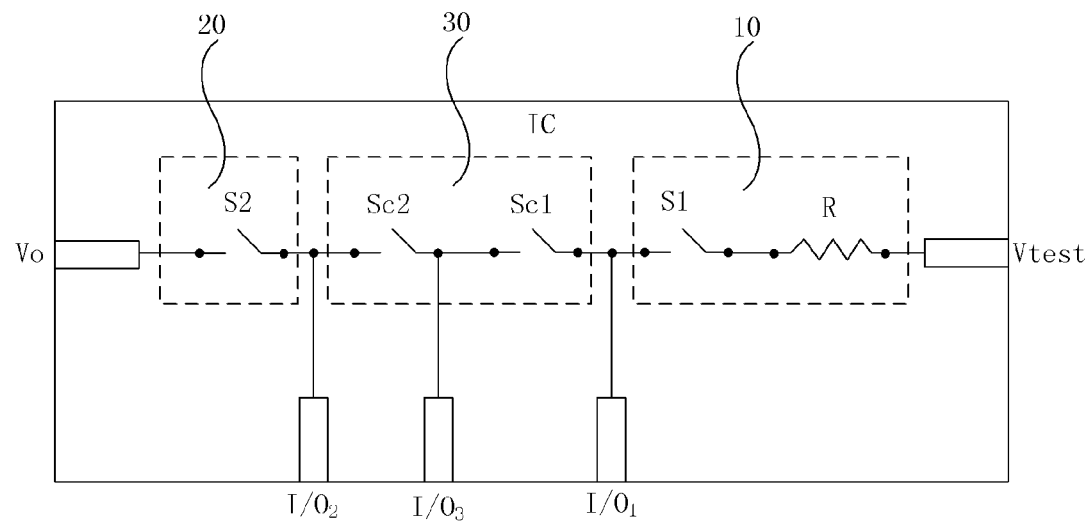
FIG. 3 is a specific structural schematic diagram of individual units of the driver chip as shown in FIG. 2b.

FIG. 3 is a specific structural schematic diagram of individual units of the driver chip as shown in FIG. 2b. As shown, the input unit 10 may comprise a first switch S1, of which one terminal is connected with the test signal input terminal Vtest, and the other terminal is connected with the test unit 30. When the first switch S1 is turned on, a signal inputted by the test signal input terminal Vtest may be transmitted to the test unit 30. The input unit 10 may further comprise a current limiting resistor R, by which the current inputted from the test signal input terminal Vtest to the test unit 30 or the first internal interface $I/O_1$ may be reduced, thereby avoiding burnout of a device internal to the test unit 30 or the first internal interface $I/O_1$ due to the current inputted by the test signal input terminal Vtest being too large.

In an example, the resistance value of the current limiting resistor R may be between 180Ω~330Ω. When the resistance value of the current limiting resistor R is less than 180Ω, its resistance value is too small, resulting in an insignificant current limiting effect. When the resistance value of the current limiting resistor R is greater than 330Ω, its resistance value is too large, resulting in a too small current flowing into the test unit 30 or the first internal interface $I/O_1$, such that the driver chip IC cannot operate normally.

The output unit 20 may comprise a second switch S2, of which one terminal is connected with the test signal output terminal Vo, and the other terminal is connected with the test unit 30. When the second switch S2 is turned on, a signal outputted by the test unit 30 and a voltage at the second internal interface $I/O_2$ may be transmitted to the test signal output terminal Vo.

The test unit 30 may comprise at least one test switch connected in series with each other, and the first switch S1 is connected in series with the second switch S2 via the at least one test switch. When the test unit 30 comprises at least two test switches (for example, a first test switch Sc1 and a second test switch Sc2 as shown in FIG. 3), a common terminal of every two neighboring test switches in series is connected with a third internal interface $I/O_3$.

A test procedure of the test circuit 01 will be described in detail below.

First, the first switch S1 and the second switch S2 are turned on, and the test unit 30 is turned off. In the case that the test unit 30 comprises two test switches Sc1, Sc2 as shown in FIG. 3, turning the test unit 30 off may comprise: turning the first test switch Sc1 off, turning the second test switch Sc2 off, or turning both the first test switch Sc1 and the second test switch Sc2 off.

Next, a first voltage is inputted via the test voltage input terminal Vtest to the input unit 10. In embodiments of the disclosure, by way of example and not limitation, the first voltage is a high level, and a second voltage is a low level.

Then, it is detected whether the voltage of the test voltage output terminal Vo is a high level. Since the test unit 30 is in the OFF state, if short-circuit has not occurred between internal interfaces on the driver chip IC, the high level inputted via the test voltage input terminal Vtest is not able to be transmitted to the test voltage output terminal Vo, and therefore the second voltage (i.e., a low level) is supposed to be outputted from the test voltage output terminal Vo.

Otherwise, if a high level is outputted from the test voltage output terminal Vo, it shows that short-circuit has occurred between the internal interfaces on the driver chip IC. In particular, in a case in which only the first test switch Sc1 is turned off in the test unit 30, the high level passing through the first switch S1 cannot be transmitted to the second test switch Sc2, and thereby cannot arrive at the test signal output terminal Vo via the second switch S2. Hence, it may be judged that short-circuit has occurred between the first internal interface $I/O_1$ and the third internal interface $I/O_3$, or between the first internal interface $I/O_1$ and the second internal interface I/O$_2$. At this point, the high level inputted via the test voltage input terminal Vtest passes through a signal path formed due to short-circuit occurring between the first internal interface I/O$_1$ and the third internal interface I/O$_3$ (or between the first internal interface I/O$_1$ and the second internal interface I/O$_2$), is transmitted to the second test switch Sc2, and reaches the test signal output terminal Vo via the second switch S2, causing the test signal output terminal Vo to output a high level.

Alternatively, in a case in which only the second test switch Sc2 is turned off in the test unit 30, it may be judged that short-circuit has occurred between the second internal interface I/O$_2$ and the third internal interface I/O$_3$, or between the second internal interface I/O$_2$ and the first internal interface I/O$_1$.

Alternatively, in a case in which both the first test switch Sc1 and the second test switch Sc2 are turned off in the test unit 30, it may be judged that short-circuit has occurred between the first internal interface I/O$_1$ and the second internal interface I/O$_2$, or short-circuit has occurred between the first internal interface I/O$_1$ and the third internal interface I/O$_3$ and between the second internal interface I/O$_2$ and the third internal interface I/O$_3$.

In the above description, the test unit 30 is illustrated as comprising two test switches Sc1, Sc2. However, corresponding to the number of internal interfaces to be tested on the driver chip IC, the test unit 30 may comprise other number of test switches. In such a case, detection of short-circuit of internal interfaces on the driver chip IC is similar to what is described previously, which will not be repeated here.

In this embodiment, although it may be detected that short-circuit has occurred to internal interfaces on the driver chip IC, it cannot be specifically determined between which internal interfaces short-circuit has occurred. For example, when only the first test switch Sc1 is turned off in the test unit 30, it may be judged that short-circuit has occurred between the first internal interface I/O$_1$ and the third internal interface I/O$_3$ or between the first internal interface I/O$_1$ and the second internal interface I/O$_2$; however, it cannot be judged between which internal interface and the first internal interface I/O$_1$ the short-circuit has occurred.

To address this, the disclosure provides the following embodiment.

Second Embodiment

Figure 4:
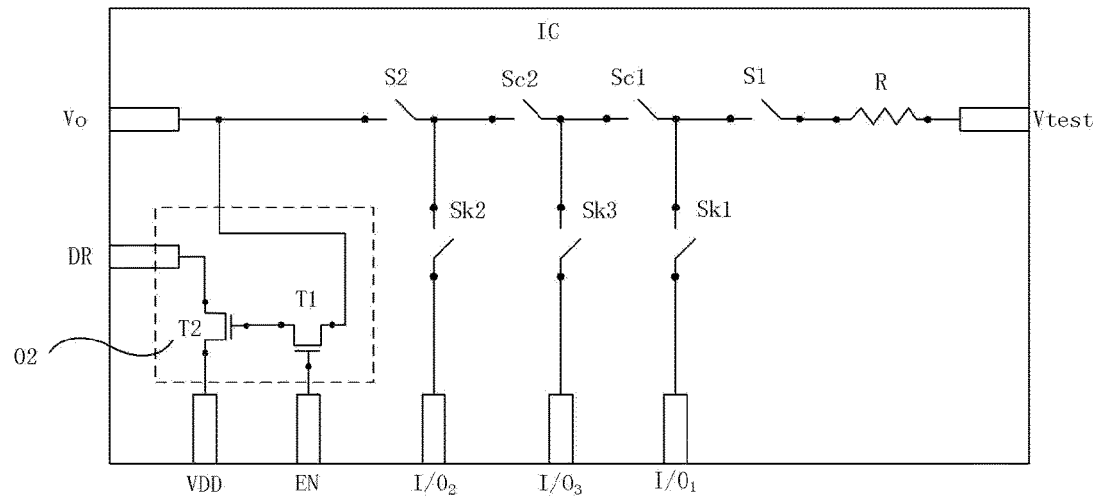
FIG. 4 is a structural schematic diagram of a driver chip provided with a driver circuit and a control switch on the basis of FIG. 3.

FIG. 4 is a structural schematic diagram of a driver chip provided with a driver circuit and a control switch on the basis of FIG. 3. On the basis of the first embodiment, as shown in FIG. 4, the test circuit 01 further comprises a plurality of control switches respectively disposed between the first internal interface I/O$_1$ and the common terminal of the first switch S1 and the first test switch Sc1, between the second internal interface I/O$_2$ and the common terminal of the second switch S2 and the second test switch Sc2, and between the third internal interface I/O$_3$ and the common terminal of two neighboring test switches (i.e., the first test switch Sc1 and the second test switch Sc2) in series, which are used for controlling the ON/OFF of connections to the first internal interface I/O$_1$, the second internal interface I/O$_2$ and the third internal interface I/O$_3$, respectively.

For convenience of description, the control switch between the first internal interface I/O$_1$ and the common terminal of the first switch S1 and the first test switch Sc1 may be referred to as a first control switch Sk1, the control switch between the second internal interface I/O$_2$ and the common terminal of the second switch S2 and the second test switch Sc2 is referred to as a second control switch Sk2, and the control switch between the third internal interface I/O$_3$ and the common terminal of two neighboring test switches (i.e., the first test switch Sc1 and the second test switch Sc2) in series is referred to as a third control switch Sk3.

A specific detection procedure may be as follows.

Assume that when only the first test switch Sc1 is turned off in the test unit 30 and other switches in the test circuit 01 are turned on, a high level is outputted from the test signal output terminal Vo.

In such a case, the third control switch Sk3 may be turned off, and at this point, if a low level is outputted from the test signal output terminal Vo, short-circuit has not occurred between the first internal interface I/O$_1$ and the second internal interface I/O$_2$. If a high level is still outputted from the test signal output terminal Vo, then short-circuit has occurred between the first internal interface I/O$_1$ and the second internal interface I/O$_2$, such that the test signal is transmitted to the second test switch Sc2 via a signal path formed due to the short-circuit of the first internal interface I/O$_1$ and the second internal interface I/O$_2$, and reaches the test signal output terminal Vo via the second switch S2, causing the test signal output terminal Vo to output a high level.

Similarly, the second control switch Sk2 is turned off, and at this point, if a low level is outputted from the test signal output terminal Vo, short-circuit has not occurred between the first internal interface I/O$_1$ and the third internal interface I/O$_3$. If a high level is still outputted from the test signal output terminal Vo, then short-circuit has occurred between the first internal interface I/O$_1$ and the third internal interface I/O$_3$.

In a case in which individual test switches in the test unit 30 are in other ON/OFF states, the approach for judging a particular short-circuit location of internal interfaces by turning a control switch on or off is similar to what is described above, and will not be repeated here.

Thus, a particular location can be judged where short-circuit occurs to internal interfaces on the driver chip IC, and thereby the maintenance of the driver chip IC or an improvement on the production process may be facilitated. For example, if short-circuit has occurred at a fixed location of a batch of produced driver chips ICs, an improvement may be made to a corresponding production process or precision based on the location with a short-circuit defect, avoiding occurrence of repetitive short-circuit defects.

After a short-circuit detection is finished for the driver chip IC, if the detection shows that short-circuit has not occurred between internal interfaces in the driver chip IC, then the driver chip may enter a working state and implement its own predetermined functions.

To achieve this, the disclosure provides the following embodiment.

Third Embodiment

On the basis of the second embodiment (or the first embodiment), as shown in FIG. 4, the driver chip IC further comprises a driver circuit 02, which is connected with the test signal output terminal Vo, a control drive signal terminal DR, an enable signal terminal EN and a supply voltage terminal VDD, respectively, and used for transmitting a voltage of the supply voltage terminal VDD to the control drive signal terminal DR under control of the enable signal terminal EN and the test signal output terminal Vo. The control drive signal terminal DR is used for providing the driver chip IC with a starting signal instructing the driver chip IC to enter the working state. In embodiments of the disclosure, by way of example and not limitation, a high level is inputted via the supply voltage terminal VDD.

As such, after the short-circuit detection procedure is finished, an enable signal is inputted via the enable signal terminal EN, and if at this point a low level is outputted from the test voltage output terminal Vo, it shows that short-circuit does not exist between internal interfaces on the driver chip IC. The driver circuit 02 transmits the high level provided by the supply voltage terminal VDD to the control drive signal terminal DR, such that the driver chip IC is powered on and enters the working state.

The driver circuit 02 may comprise a first transistor T1 and a second transistor T2. A gate of the first transistor T1 is connected to the enable signal terminal EN, a first electrode of the first transistor T1 is connected to the test signal output terminal Vo, and a second electrode of the first transistor T1 is connected with a gate of the second transistor T2. A first electrode of the second transistor T2 is connected to the supply voltage terminal VDD, and a second electrode of the second transistor T2 is connected with the control drive signal terminal DR. The first transistor T1 may be an N-type or P-type transistor, and the second transistor T2 may be a P-type transistor.

Taking that the first transistor T1 is an N-type transistor and the second transistor T2 is a P-type transistor as an example, the work procedure of the driver circuit 02 will be described below.

After the short-circuit detection procedure is finished, a high level is inputted via the enable signal terminal EN to turn the first transistor T1 on, such that a signal outputted from the test signal output terminal Vo can be transmitted to the gate of the second transistor T2 via the first transistor T1. If a high level is outputted from the test signal output terminal Vo (showing that short-circuit exists between internal interfaces on the driver chip IC), the high level will not be able to turn the second transistor T2 on, such that the driver chip IC will not enter the working state. If a low level is outputted from the test signal output terminal Vo (showing that short-circuit does not exist between internal interfaces on the driver chip IC), the low level will turn the second transistor T2 on, such that the high level inputted via the supply voltage terminal VDD is transmitted to the control drive signal terminal DR, and then the driver chip IC is powered on and enters the working state.

As such, by way of the driver circuit 02, it may be guaranteed that only when short-circuit does not exist between internal interfaces on the driver chip IC, will the driver chip IC enter the working state.

Figure 1:
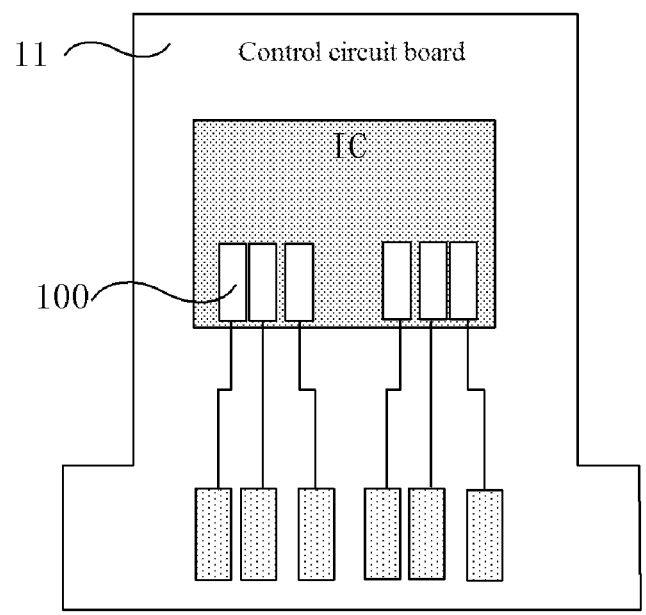
FIG. 1 is a schematic diagram of a connection for a control circuit board and an LCM of a display device in the prior art.
Figure 5:
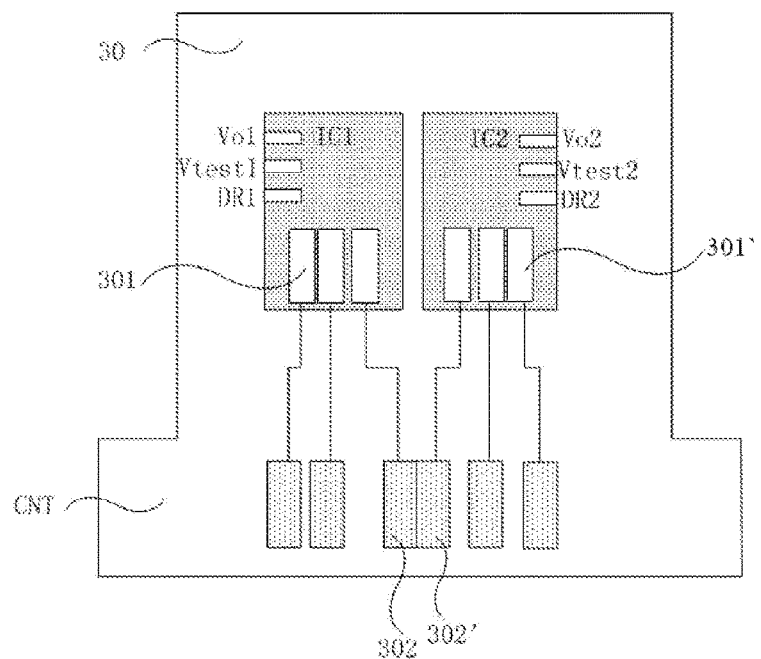
FIG. 5 is a structural schematic diagram of a driver board according to an embodiment of the disclosure.

FIG. 5 is a structural schematic diagram of a driver board 30 according to an embodiment of the disclosure. As shown, the driver board 30 comprises an external interface 302 located at a snap-fit position CNT of the driver board 30 and at least one of the driver chips ICs as described above. Each of the internal interfaces 301, 301' (the first internal interface I/O$_1$, the second internal interface I/O$_2$, or the third internal interface I/O$_3$ as shown in FIG. 4) of the driver chip IC is connected with a respective one of the external interfaces 302, 302'. The driver board 30 may be the control circuit board 11 as shown in FIG. 1.

For a driver board 30 provided with a single driver chip IC, since each external interface 302 is connected with a respective internal interface 301, the method for testing short-circuit between two neighboring external interfaces 302 is the same as the test method for internal interfaces 301 provided by the previous embodiments, and will not be repeated here.

When at least two driver chips ICs are disposed on the driver board 30, not only whether short-circuit exists between internal interfaces of a driver chip, but also whether short-circuit exists between external interfaces of different driver chips may be detected on the driver board 30.

Fourth Embodiment

Figure 6:
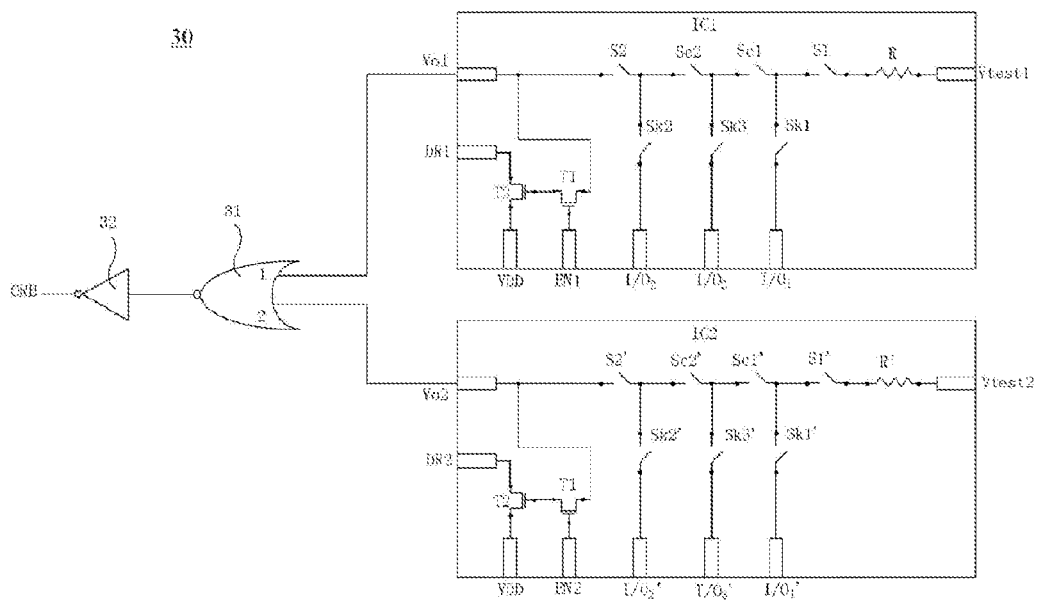
FIG. 6 is a schematic diagram of a connection structure of two driver chips in the driver board as shown in FIG. 5.

FIG. 6 is a schematic diagram of a connection structure of two driver chips in the driver board as shown in FIG. 5. As shown, the driver board 30 may comprise at least two driver chips: a first driver chip IC1 and a second driver chip IC2. The driver board 30 may further comprise an NOR gate 31 and an inverter 32.

A first input terminal of the NOR gate 31 is connected with the test signal output terminal Vo1 of the first driver chip IC1, a second input terminal of the NOR gate 31 is connected with the test signal output terminal Vo2 of the second driver chip IC2, an output terminal of the NOR gate 31 is connected with the input terminal of the inverter 32, and an output terminal of the inverter 32 is connected to a feedback signal output terminal ORB on the driver board 30.

Figure 7:
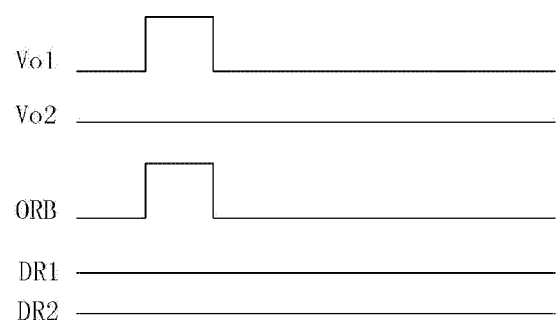
FIG. 7 is a signal control timing diagram of the driver board as shown in FIG. 6.
Figure 8:
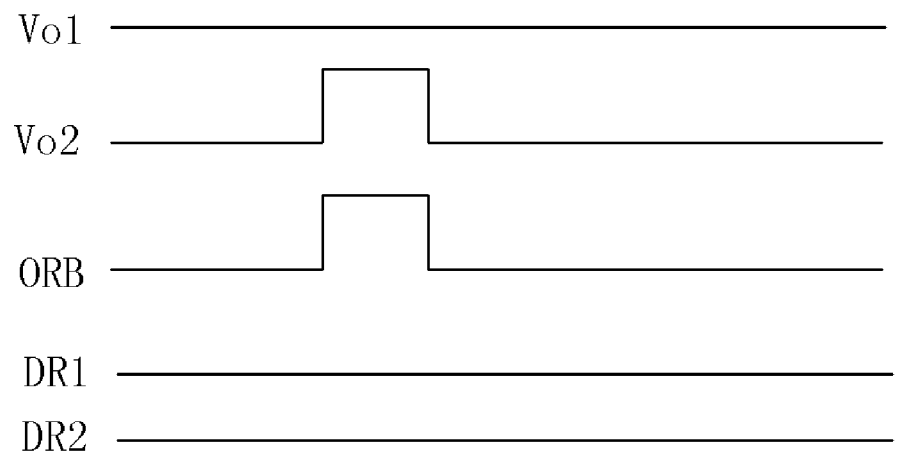
FIG. 8 is another signal control timing diagram of the driver board as shown in FIG. 6.

As shown in FIG. 7 or FIG. 8, if one of the test signal output terminal Vo1 of the first driver chip IC1 and the test signal output terminal Vo2 of the second driver chip IC2 is of a high level, it shows that short-circuit exists between internal interfaces of the first driver chip IC1 or the second driver chip IC2, or short-circuit exists between external interfaces of the first driver chip IC1 and the second driver chip IC2. At this point, the NOR gate 31 inputs a low level to the inverter 32, and by means of the phase inversion of the inverter 32, a high level feedback signal is caused to be outputted from the feedback signal output terminal ORB on the driver board 30. After receiving the feedback signal, a circuitry provided with the driver board 30 may perform an alarm action and stop a subsequent power-on operation. In such a case, both the control drive signal terminal DR1 of the first driver chip IC1 and the control drive signal terminal DR2 of the second driver chip IC2 are at a low level, avoiding that the first driver chip IC1 or the second driver chip IC2 enters the working state after the short-circuit test.

Figure 9:
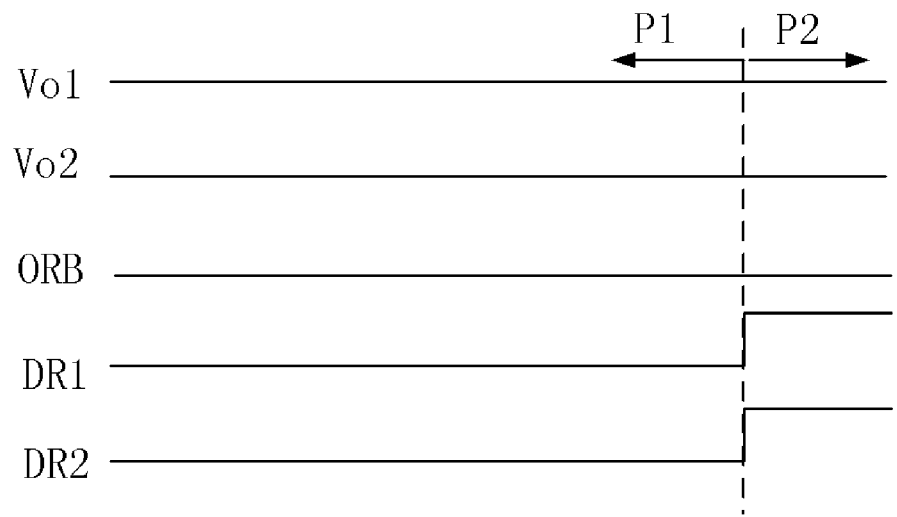
FIG. 9 is yet another signal control timing diagram of the driver board as shown in FIG. 6.

As shown in FIG. 9, in a short-circuit testing phase P1, if both the test signal output terminal Vo1 of the first driver chip IC1 and the test signal output terminal Vo2 of the second driver chip IC2 output a low level, it shows that the short-circuit does not exist. The NOR gate 31 inputs a high level to the inverter 32, and by means of the phase inversion of the inverter 32, a low level feedback signal is caused to be outputted from the feedback signal output terminal ORB on the driver board 30. After receiving the feedback signal, the circuitry provided with the driver board 30 may perform a subsequent power-on operation, which causes the circuitry to begin to operate normally. In such a case, after the short-circuit test is finished, namely, at a phase P2, both the control drive signal terminal DR1 of the first driver chip IC1 and the control drive signal terminal DR2 of the second driver chip IC2 are at a high level, causing the first driver chip IC1 and the second driver chip IC2 to enter the working state.

A procedure of detecting whether short-circuit has occurred between external interfaces 302, 302' of two neighboring driver chips will be described below.

In an implementation, first, the output unit 20 of the first driver chip IC1 and the input unit 10 of the second driver chip IC2 are turned on, and the input unit 10 of the first driver chip IC1 and the output unit 20 of the second driver chip IC2 are turned off. Specifically, as shown in FIG. 6, the second switch S2 of the first driver chip IC1 and the first switch S1' of the second driver chip IC2 are turned on, and the first switch S1 of the first driver chip IC1 and the second switch S2' of the second driver chip IC2 are turned off. In addition, in a default state, the control switches Sk1, Sk2, Sk3 of the first driver chip IC1 and the control switches Sk1', Sk2', Sk3' of the second driver chip IC2 are turned on.

Then, a test signal is inputted to the test signal input terminal Vtest2 of the second driver chip IC2.

Finally, if a high level is outputted from the test signal output terminal Vo1 of the first driver chip IC1, then short-circuit has occurred, on the driver board, between an external interface 302 connected with the first driver chip IC1 and an external interface 302' connected with the second driver chip IC2 (as shown in FIG. 5), such that the test signal inputted via the test signal input terminal Vtest2 of the second driver chip IC2 is transmitted to the test signal output terminal Vo1 of the first driver chip IC1 via a signal path formed due to short-circuit of the external interface 302 connected with the first driver chip IC1 and the external interface 302' connected with the second driver chip IC2. With reference to FIG. 6, for example, in a case in which the test switches Sc1, Sc2 and the test switches Sc1', Sc2' are turned off, it may be judged that short-circuit has occurred to the external interface 302 connected to the internal interface I/O$_2$ and the external interface 302' connected to the internal interface I/O$_1$'. Similarly, when the test switches Sc1, Sc2 and the test switches Sc1', Sc2' are in other ON/OFF states, short-circuit between other external interfaces may be judged.

Alternatively, in another implementation, first, the output unit 20 of the second driver chip IC2 and the input unit 10 of the first driver chip IC1 are turned on, and the input unit 10 of the second driver chip IC2 and the output unit 20 of the first driver chip IC1 are turned off. Specifically, as shown in FIG. 6, the second switch S2' of the second driver chip IC2 and the first switch S1 of the first driver chip IC1 are turned on, and the first switch S1' of the second driver chip IC2 and the second switch S2 of the first driver chip IC1 are turned off. As described previously, in a default state, the control switches Sk1, Sk2, Sk3 in the first driver chip IC1 and the control switches Sk1', Sk2', Sk3' in the second driver chip IC2 are turned on.

Then, a test signal is inputted via the test signal input terminal Vtest1 of the first driver chip IC1.

Finally, if a high level is outputted from the test signal output terminal Vo2 of the second driver chip IC2, short-circuit has occurred, on the driver board 30, between an external interface 302 connected with the first driver chip IC1 and an external interface 302' connected with the second driver chip IC2 (as shown in FIG. 5), such that the test signal inputted via the test signal input terminal Vtest1 of the first driver chip IC1 is transmitted to the test signal output terminal Vo2 of the second driver chip IC2 via a signal path formed due to short-circuit of the external interface 302 of the first driver chip IC1 and the external interface 302' of the second driver chip IC2. With reference to FIG. 6, for example, in a case in which the test switches Sc1, Sc2 and the test switches Sc1', Sc2' are turned off, it may be judged that short-circuit has occurred to the external interface 302 connected to the internal interface I/O$_1$ and the external interface 302' connected to the internal interface I/O$_2$'. Similarly, when the test switches Sc1, Sc2 and the test switches Sc1', Sc2' are in other ON/OFF states, short-circuit between other external interfaces may be judged.

Figure 10:
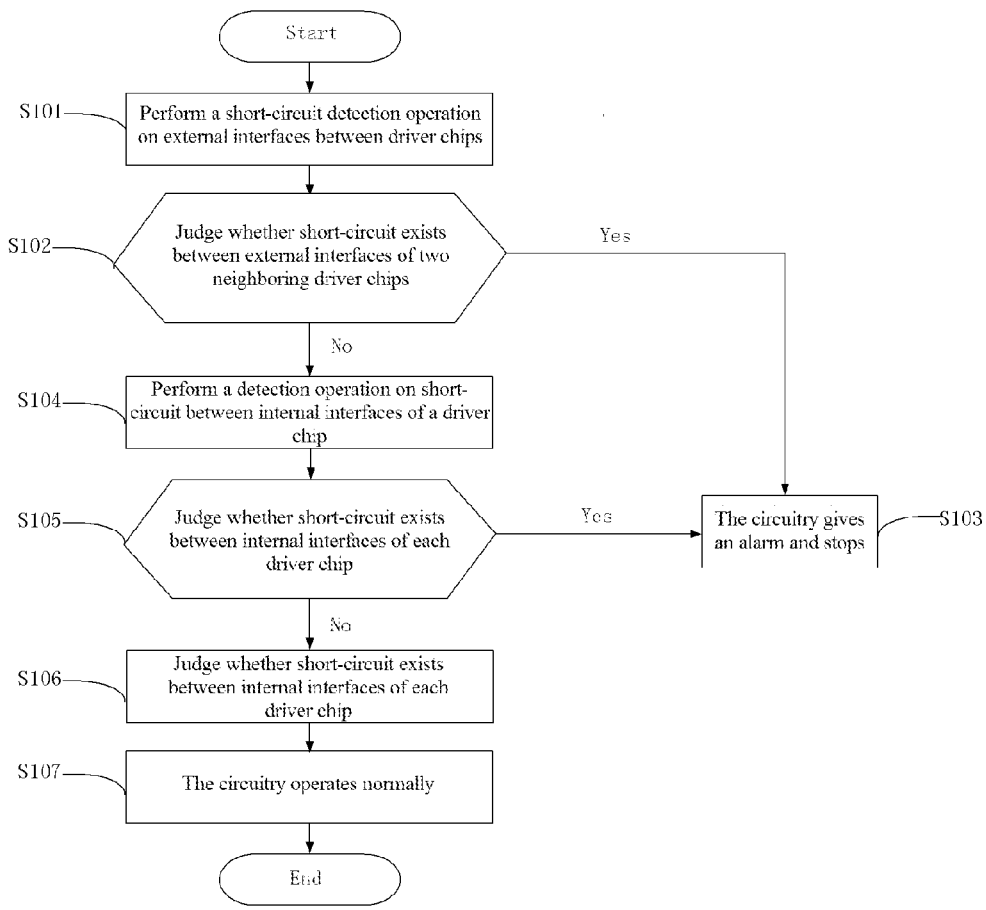
FIG. 10 is a flow chart of a control procedure of a circuitry provided with a driver board as shown in FIG. 6.

FIG. 10 is a flow chart of a control procedure of a circuitry provided with a driver board 30 as shown in FIG. 6. As shown, a particular control procedure may comprise the following steps.

At S101, a short-circuit detection operation is performed on external interfaces between driver chips ICs.

Specifically, the short-circuit detection is performed on a driver chip IC on the driver board 30 via the test circuit 01 of the driver chip IC.

At S102, it is judged whether short-circuit exists between external interfaces 302 of two neighboring driver chips ICs.

In particular, if the short-circuit exists, then step S103 is performed; otherwise, step S104 is performed.

At S103, the circuitry gives an alarm and stops working.

If the judgment at step S102 is that short-circuit exists, the circuitry gives an alarm and stops working. Specifically, if the short-circuit exists, a high level is outputted from the feedback signal output terminal ORB on the driver board 30, and if a low level is outputted from the feedback signal output terminal ORB on the driver board 30, then short-circuit has not happened.

At S104, a detection operation is performed on short-circuit between internal interfaces of a driver chip IC, if the judgment at step S102 is that short-circuit does not exist.

At S105, it is judged whether short-circuit exists between internal interfaces 301 of each driver chip IC.

If the judgment result at step S105 is that short-circuit exists, step S103 is performed; otherwise, step S106 is performed.

At S106, if the judgment result at step S105 is that short-circuit does not exist, then a power supply management component of the circuitry performs the power-on operation.

At S107, the circuitry operates normally.

According to another aspect of the disclosure, a display device is provided comprising any of the driver boards as described above. The display device may comprise a liquid crystal display device, which may be, for example, any product or component having a display function, such as a liquid crystal display, a liquid crystal TV, a digital photo frame, a mobile phone or a tablet computer.

Figure 11:
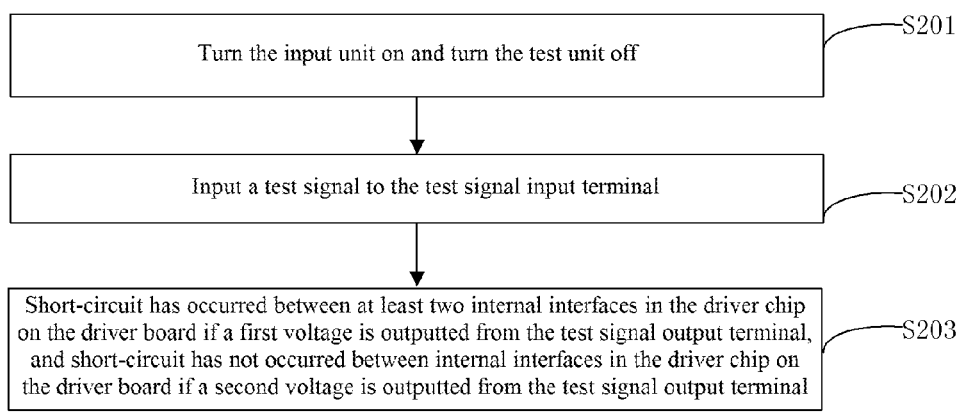
FIG. 11 is a flow chart of a test method for a driver board according to an embodiment of the disclosure.

FIG. 11 is a flow chart of a test method for a driver board according to an embodiment of the disclosure. As shown in FIG. 11, the method may comprise the following steps.

At S201, the input unit 10 as shown in FIG. 2a is turned on and the test unit 30 is turned off.

S202, a test signal is inputted to the test signal input terminal VtestAt S203, short-circuit has occurred between at least two internal interfaces 301 in the driver chip IC on the driver board if a first voltage is outputted from the test signal output terminal Vo, and short-circuit has not occurred between internal interfaces 301 in the driver chip IC on the driver board if a second voltage is outputted from the test signal output terminal Vo. The first voltage is greater than the second voltage. As described above, the first voltage is a high level, and the second voltage is a low level.

In a case in which the driver board comprises at least two driver chips as described: a first driver chip IC1 and a second driver chip IC2, the method for detecting whether short-circuit has occurred between external interfaces of two neighboring driver chips is illustrated in detail by the following embodiment.

Fifth Embodiment

Figure 12:
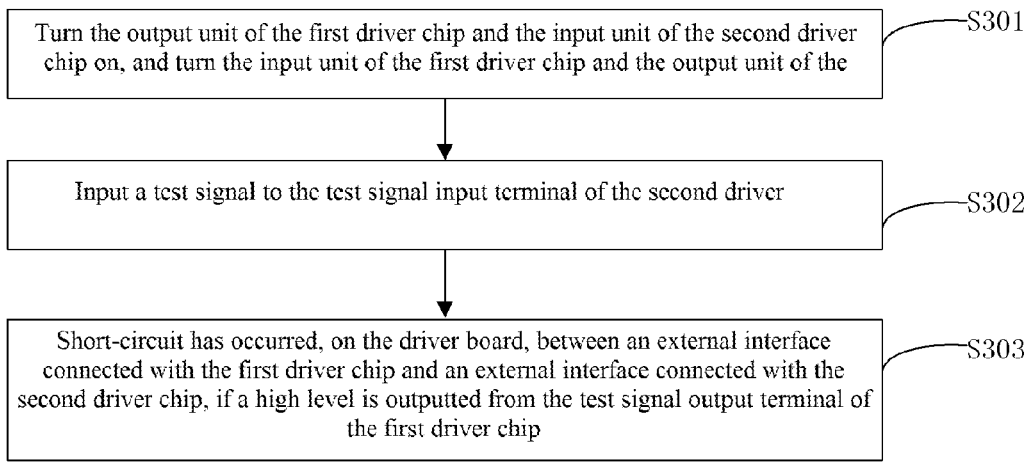
FIG. 12 is a flow chart of a test method for a driver board as shown in FIG. 6.

As shown in FIG. 12, the short-circuit detection method may comprise the following steps.

At step S301, the output unit 20 of the first driver chip IC1 and the input unit 10 of the second driver chip IC2 are turned on, and the input unit 10 of the first driver chip IC1 and the output unit 20 of the second driver chip IC2 are turned off. Specifically, as shown in FIG. 6, the second switch S2 of the first driver chip IC1 and the first switch S1' of the second driver chip IC2 are turned on, and the first switch S1 of the first driver chip IC1 and the second switch S2' of the second driver chip IC2 are turned off. In addition, in a default state, the control switches Sk1, Sk2, Sk3 in the first driver chip IC1 and the control switches Sk1', Sk2', Sk3' in the second driver chip IC2 are turned on.

At S302, a test signal is inputted via the test signal input terminal Vtest2 of the second driver chip IC2.

At S303, if a high level is outputted from the test signal output terminal Vo1 of the first driver chip IC1, then short-circuit has occurred, on the driver board, between an external interface 302 connected with the first driver chip IC1 and an external interface 302' connected with the second driver chip IC2 (as shown in FIG. 5), such that the test signal inputted by the test signal input terminal Vtest2 of the second driver chip IC2 is transmitted to the test signal output terminal Vo1 of the first driver chip IC1 via a signal path formed due to short-circuit of the external interface 302 of the first driver chip IC1 and the external interface 302' of the second driver chip IC2. With reference to FIG. 6, for example, in a case in which the test switches Sc1, Sc2 and the test switches Sc1', Sc2' are turned off, it may be judged that short-circuit has occurred to the external interface 302 connected to the internal interface I/O$_2$ and the external interface 302' connected to the internal interface I/O$_1$'. Similarly, when the test switches Sc1, Sc2 and the test switches Sc1', Sc2' are in other ON/OFF states, short-circuit between other external interfaces may be judged.

Sixth Embodiment

Figure 13:
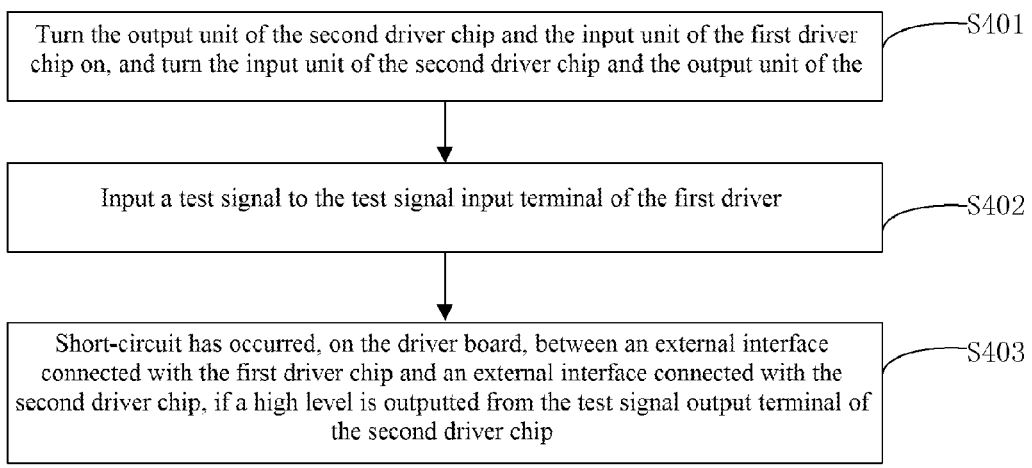
FIG. 13 is a flow chart of another test method for a driver board as shown in FIG. 6.

The short-circuit detection method may, as shown in FIG. 13, comprise the following steps.

At step S401, the output unit 20 of the second driver chip IC2 and the input unit 10 of the first driver chip IC1 are turned on, and the input unit 10 of the second driver chip IC2 and the output unit 20 of the first driver chip IC1 are turned off. Specifically, as shown in FIG. 6, the second switch S2' of the second driver chip IC2 and the first switch S1 of the first driver chip IC1 are turned on, and the first switch S1' of the second driver chip IC2 and the second switch S2 of the first driver chip IC1 are turned off. In addition, in a default state, the control switches Sk1, Sk2, Sk3 in the first driver chip IC1 and the control switches Sk1', Sk2', Sk3' in the second driver chip IC2 are turned on.

At step S402, a test signal is inputted via the test signal input terminal Vtest1 of the first driver chip IC1.

At step S403, if a high level is outputted from the test signal output terminal Vo2 of the second driver chip IC2, short-circuit has occurred, on the driver board 30, between an external interface 302 connected with the first driver chip IC1 and an external interface 302' connected with the second driver chip IC2 (as shown in FIG. 5), such that the test signal inputted via the test signal input terminal Vtest1 of the first driver chip IC1 is transmitted to the test signal output terminal Vo2 of the second driver chip IC2 via a signal path formed due to short-circuit of the external interface 302 of the first driver chip IC1 and the external interface 302' of the second driver chip IC2. With reference to FIG. 6, for example, in a case in which the test switches Sc1, Sc2 and the test switches Sc1', Sc2' are turned off, it may be judged that short-circuit has occurred to the external interface 302 connected to the internal interface I/O$_1$ and the external interface 302' connected to the internal interface I/O$_2$'. Similarly, when the test switches Sc1, Sc2 and the test switches Sc1', Sc2' are in other ON/OFF states, short-circuit between other external interfaces may be judged.

In addition, whether for the fifth embodiment or for the sixth embodiment, when the test signal output terminal (the test signal output terminal Vo1 of the first driver chip IC1 or the test signal output terminal Vo2 of the second driver chip IC2) outputs a low level, the control drive signal terminal of the driver circuit 02 (the control drive signal terminal DR1 of the first driver chip IC1 or the control drive signal terminal DR2 of the second driver chip IC2) may be at a high level, so as to cause the driver chip IC to enter the working state.

It may be appreciated by those of ordinary skills in the art that all or part of the steps of the above method embodiments may be implemented with program instruction related hardware. The program may be stored in a computer readable storage medium, which performs the steps of the above method embodiments when executed. The storage medium mentioned comprises various media which may store a program code, such as ROM, RAM, a magnetic disk or an optical disc.

It should further be noted that the driver chip described herein is not limited to a driver chip in a display apparatus (for example, a source driver chip, a gate driver chip), but may refer to any integrated circuit chip with an internal interface as described herein, whether it is used for the purpose of "driving" or not. In other words, the so-called driver chip should not be understood in a limiting sense of "having a driver function".

The foregoing is only specific embodiments of the disclosure. However, the protection scope of the disclosure is not limited thereto. Variations or substitutions readily occurring to any artisan familiar with the technical field should be encompassed within the protection scope of the disclosure. Therefore, the protection scope of the disclosure should be defined by the claims.

The invention claimed is:

1. A driver chip comprising:
   a first internal interface;
   a second internal interface; and
   a test circuit configured to perform a short-circuit detection on the internal interfaces, the test circuit comprising an input unit and a test unit;
   wherein the input unit is connected with a test signal input terminal, the test unit and the first internal interface, respectively, and configured to transmit a test signal inputted via the test signal input terminal to the test unit and the first internal interface when the input unit is in an ON state; and
   wherein the test unit is connected with the second internal interface and a test signal output terminal, respectively, and configured to prevent a signal outputted by the input unit from being outputted from the test unit to the test signal output terminal and the second internal interface when the test unit is in an OFF state.

2. The driver chip as claimed in claim 1, further comprising an output unit disposed between the test signal output terminal and the second internal interface, and configured to output a voltage at the second internal interface or a signal outputted by the test unit to the test signal output terminal when the output unit is in an ON state.

3. The driver chip as claimed in claim 2, wherein the input unit comprises a first switch, a terminal thereof connected with the test signal input terminal, the other terminal thereof connected with the test unit.

4. The driver chip as claimed in claim 3, wherein the output unit comprises a second switch, a terminal thereof connected with the test signal output terminal, the other terminal thereof connected with the test unit.

5. The driver chip as claimed in claim 4, wherein the test unit comprises at least one test switch connected in series with each other, the first switch connected in series with the second switch via the test switch, a common terminal of every two neighboring test switches in series connected with a third internal interface.

6. The driver chip as claimed in claim 5, wherein the test circuit further comprises a plurality of control switches respectively disposed between the first internal interface and a common terminal of the first switch and a test switch connected in series with the first switch, between the second internal interface and a common terminal of the second switch and a test switch connected in series with the second switch, and between the third internal interface and the common terminal of the two neighboring test switches in series, and configured to control the ON/OFF of connections to the first internal interface, the second internal interface and the third internal interface, respectively.

7. The driver chip as claimed in claim 1, wherein the input unit comprises a first switch, a terminal thereof connected with the test signal input terminal, the other terminal thereof connected with the test unit.

8. The driver chip as claimed in claim 7, wherein the input unit further comprises a current limiting resistor disposed between the test signal input terminal and the first switch.

9. The driver chip as claimed in claim 3, wherein the input unit further comprises a current limiting resistor disposed between the test signal input terminal and the first switch.

10. The driver chip as claimed in claim 1, further comprising a driver circuit connected with the test signal output terminal, a control drive signal terminal, an enable signal terminal and a supply voltage terminal, respectively, and configured to transmit a voltage of the supply voltage terminal to the control drive signal terminal under control of the enable signal terminal and the test signal output terminal.

11. The driver chip as claimed in claim 10, wherein the driver circuit comprises a first transistor and a second transistor, wherein a gate of the first transistor is connected to the enable signal terminal, a first electrode of the first transistor is connected to the test signal output terminal, and a second electrode of the first transistor is connected to a gate of the second transistor, and wherein a first electrode of the second transistor is connected to the supply voltage terminal, and a second electrode of the second transistor is connected to the control drive signal terminal, the first transistor being an N-type or P-type transistor, the second transistor being a P-type transistor.

12. A driver board comprising at least one driver chip as claimed in claim 1 and an external interface located at a snap-fit position of the driver board, wherein each of the internal interfaces of the driver chip is connected with a respective external interface.

13. The driver board as claimed in claim 12, wherein the at least one driver chip comprises a first driver chip and a second driver chip, and the driver board further comprises an NOR gate and an inverter, wherein a first input terminal of the NOR gate is connected with the test signal output terminal of the first driver chip, a second input terminal of the NOR gate is connected with the test signal output terminal of the second driver chip, and an output terminal of the NOR gate is connected with an input terminal of the inverter, and wherein an output terminal of the inverter is connected to a feedback signal output terminal of the driver board.

14. A test method for testing a driver board as claimed in claim 13, comprising:
    turning the input unit on;
    turning the test unit off;
    inputting a test signal to the test signal input terminal;
    determining that short-circuit has occurred between at least two internal interfaces in the driver chip on the driver board if a first voltage is outputted from the test signal output terminal; and
    determining that short-circuit has not occurred between the internal interfaces in the driver chip on the driver board if a second voltage is outputted from the test signal output terminal, wherein the first voltage is greater than the second voltage.

15. A test method for testing a driver board as claimed in claim 12, comprising:
    turning the input unit on;
    turning the test unit off;
    inputting a test signal to the test signal input terminal;
    determining that short-circuit has occurred between at least two internal interfaces in the driver chip on the driver board if a first voltage is outputted from the test signal output terminal; and
    determining that short-circuit has not occurred between the internal interfaces in the driver chip on the driver board if a second voltage is outputted from the test signal output terminal, wherein the first voltage is greater than the second voltage.

16. The test method as claimed in claim 15, wherein the at least one driver chip comprises a first driver chip and a second driver chip, and both the first driver chip and the second driver chip comprise an output unit, the output unit disposed between the test signal output terminal and the second internal interface, and configured to output a voltage at the second internal interface or a signal outputted by the test unit to the test signal output terminal when the output unit is in an ON state, the test method comprising:
    turning the output unit of the first driver chip and the input unit of the second driver chip on;
    turning the input unit of the first driver chip and the output unit of the second driver chip off;
    inputting a test signal to the test signal input terminal of the second driver chip; and
    determining that short-circuit has occurred between an external interface connected with the first driver chip and an external interface connected with the second driver chip, if the first voltage is outputted from the test signal output terminal of the first driver chip; or
    turning the output unit of the second driver chip and the input unit of the first driver chip on;
    turning the input unit of the second driver chip and the output unit of the first driver chip off;
    inputting a test signal to the test signal input terminal of the first driver chip; and
    determining that short-circuit has occurred between an external interface connected with the first driver chip and an external interface connected with the second driver chip, if the first voltage is outputted from the test signal output terminal of the second driver chip.

17. The test method as claimed in claim 15, wherein the driver chip of the driver board comprises a driver circuit, the driver circuit connected with the test signal output terminal, a control drive signal terminal, an enable signal terminal and a supply voltage terminal, respectively, and configured to transmit a voltage of the supply voltage terminal to the control drive signal terminal under control of the enable signal terminal and the test signal output terminal, the test method further comprising:

transmitting, by the driver circuit, a voltage of the supply voltage terminal to the control drive signal terminal, if the second voltage is outputted from the test signal output terminal.

18. The test method as claimed in claim 15, wherein the first voltage is a high level, and the second voltage is a low level.

19. A display device comprising a driver board as claimed in claim 12.

* * * * *